United States Patent
Yin et al.

(10) Patent No.: US 9,531,147 B2
(45) Date of Patent: Dec. 27, 2016

(54) PULSE PICKING LASER

(71) Applicant: Photonics Industries International, Inc., Ronkonkoma, NY (US)

(72) Inventors: Yusong Yin, Stonybrook, NY (US); Andrea Burzo, Holbrook, NY (US); Sergiy Nazarenko, Ronkonkoma, NY (US)

(73) Assignee: Photonics Industries Int'l., Ronkonkoma, NY (US)

( * ) Notice: Subject to any disclaimer, the term of this patent is extended or adjusted under 35 U.S.C. 154(b) by 32 days.

(21) Appl. No.: 14/549,614

(22) Filed: Nov. 21, 2014

(65) Prior Publication Data

US 2016/0149367 A1    May 26, 2016

(51) Int. Cl.
*G02F 1/11* (2006.01)
*H01S 3/00* (2006.01)
*H01S 3/137* (2006.01)
*H01S 3/23* (2006.01)

(52) U.S. Cl.
CPC ......... *H01S 3/0085* (2013.01); *H01S 3/0064* (2013.01); *H01S 3/137* (2013.01); *H01S 3/2308* (2013.01)

(58) Field of Classification Search
USPC .......................... 359/287–295, 333, 342–347
See application file for complete search history.

(56) References Cited

U.S. PATENT DOCUMENTS

| | | | |
|---|---|---|---|
| 5,696,782 A | 12/1997 | Harter | |
| 8,189,971 B1 * | 5/2012 | Vaissie | H01S 3/0057 359/333 |
| 2012/0062984 A1 | 3/2012 | Tong | |
| 2012/0212804 A1 * | 8/2012 | Sarkisyan | H01S 3/2325 359/342 |

FOREIGN PATENT DOCUMENTS

WO    WO2009132375    11/2009

OTHER PUBLICATIONS

Noris, Femtosecond pulse amplificationat 250 kHz with a Ti:sapphire regenerative amplifier and application to continuum generation, Optics Letters Jul. 15, 1992, vol. 17, No. 14, pp. 1009-1011.

* cited by examiner

*Primary Examiner* — Mohammed Hasan
(74) *Attorney, Agent, or Firm* — James A. Quinton

(57) ABSTRACT

A mode locked laser supplies a high repetition seed pulse train along a seed beam path to a pulse picker having at least one polarizer. A Faraday rotator in optical communication with the seed beam rotates the polarization of the seed beam by about 45°. A double pass acousto optical modulator (AOM) receives the seed beam propagating through the Faraday rotator and diffracts the seed beam into a first order first pass beam and a zero order first pass beam. A reflector returns the first pass first order beam into the acousto optical modulator for a second pass. The modulator diffract the beam into a zero order second pass beam and a first order second pass diffracted beam, the first order second pass beam propagating on the substantially same path as the incoming seed beam but in the opposite direction.

19 Claims, 10 Drawing Sheets

Beam profile of the first diffracted order in the first pass

Beam profile of the first diffracted order in the second pass

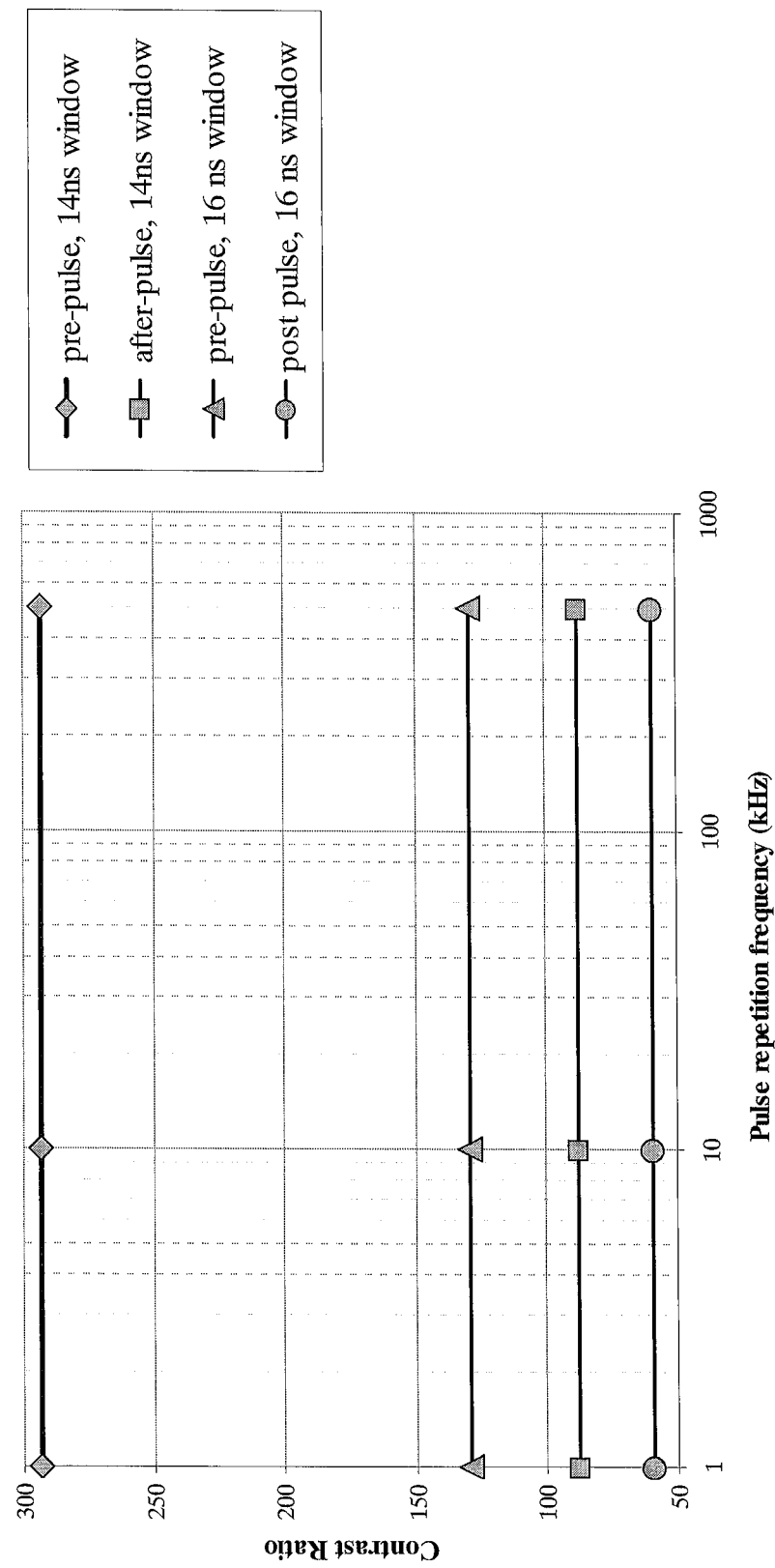
Fig.6: Contrast ratio of the single pass AOM pulse picker for different RF windows. The spot size in the AOM is about 40 microns.

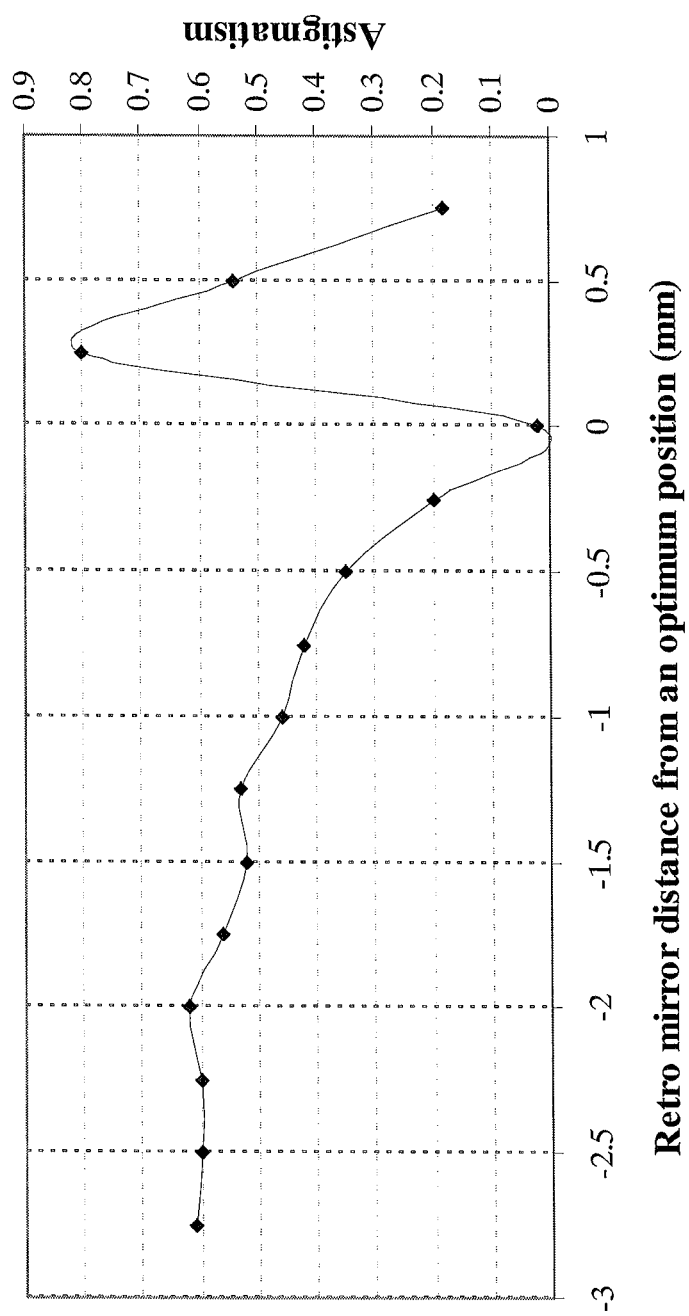
Fig.7: Second pass first order diffracted beam astigmatism versus distance between the retroreflection mirror and AOM

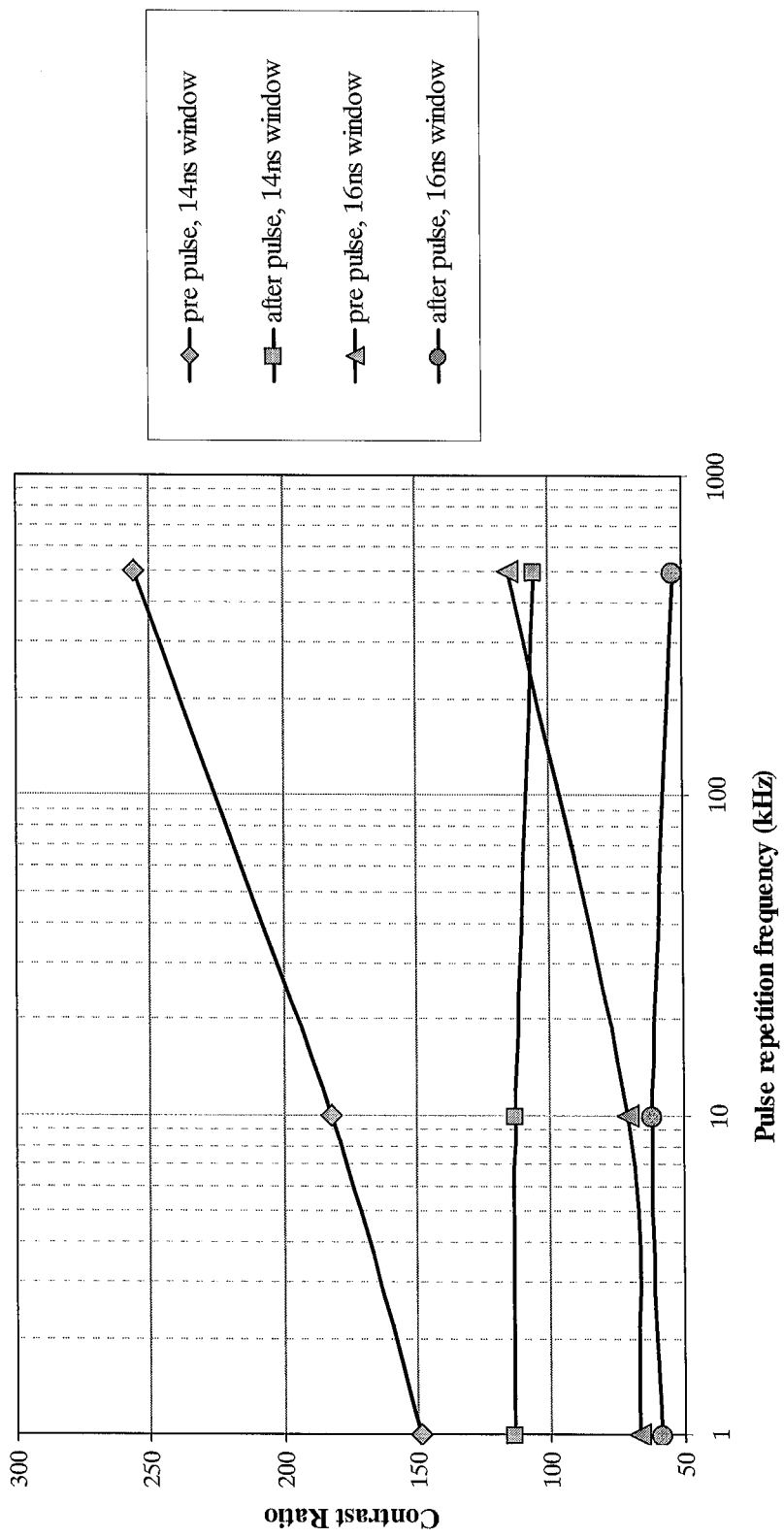
Fig. 9: Contrast ratio of the single pass AOM pulse picker amplified in a MOPA for different RF windows. The spot size in the AOM is about 40 microns.

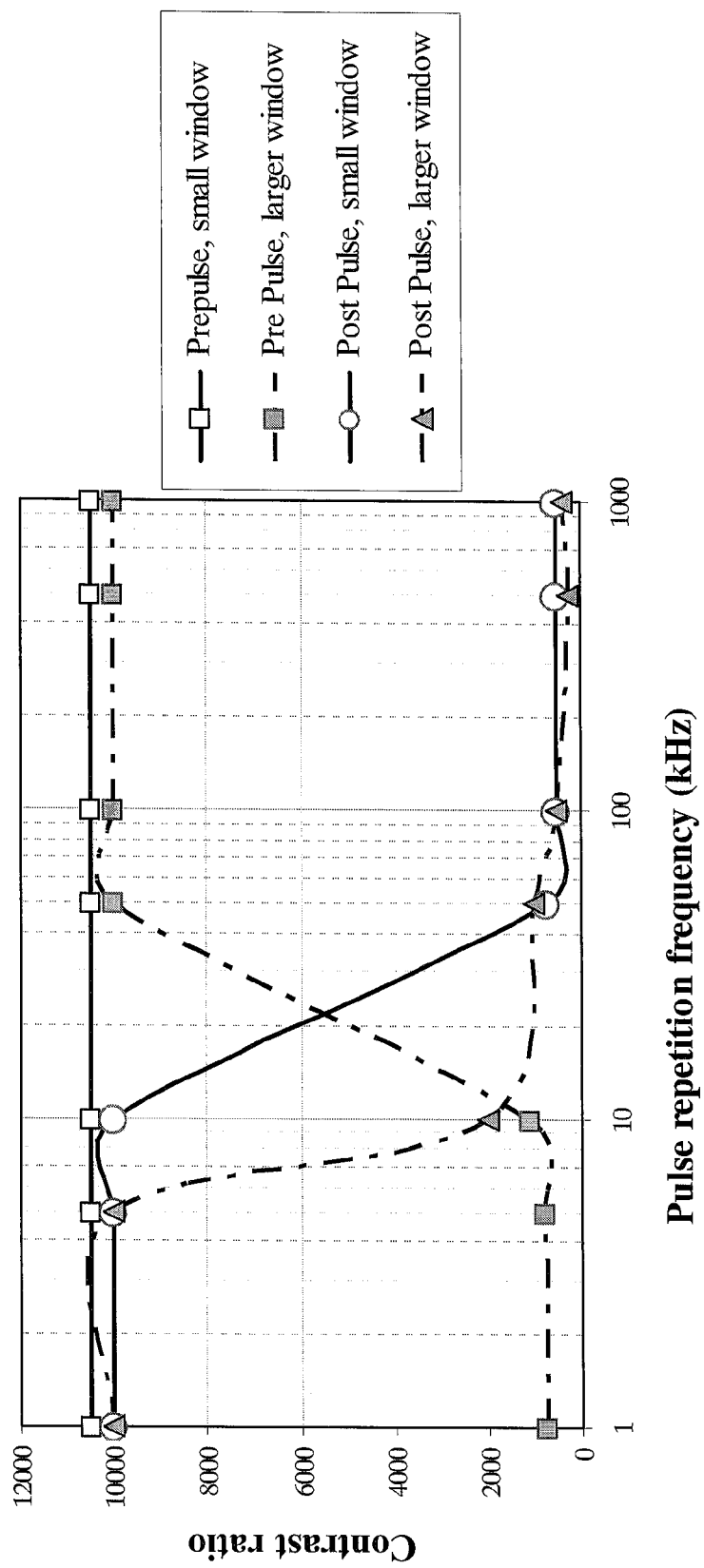
Fig.10: Contrast ratio of the double pass AOM pulse picker amplified in a MOPA for different timing windows. The spot size in the AOM is about 50 microns.

PULSE PICKING LASER

FIELD OF THE INVENTION

The field of the invention is related to a system and a method of supplying ultra short rapid pulses, at a desired repetition rate with improved contrast ratio of the background and side pulses.

BACKGROUND OF THE INVENTION

A high pulse energy system based on a Master Oscillator Power Amplifier often requires a reduction of the repetition rate of the oscillator to a desired user frequency via a pulse picking mechanism. The pulse picking is typically accomplished by using a pair of Pockels cells, which are electro-optic devices that cause a polarization retardation to a laser beam when a high voltage (several kV) is applied. For the formation of short duration pulses, the high voltage signal to the electro-optic crystal must be turned on and off very rapidly. The rise time can be adjusted to be on the order of 3-5 nanoseconds, but to keep the fall time on the pulse on the same duration necessitates sometimes the use of a second Pockels cell. Using Pockels cells, the pulse picking repetition rate can be adjusted to be around 1 MHz.

Although effective, this method of pulse picking is not used here for multiple reasons. First, a pair of high-speed Pockels cells and associated high-speed/high-voltage electronics is not readily available as an 'off-the-shelf' system and must be specially designed and built. Not only these devices are expensive, but in addition, the use of high voltage electronics raises safety and reliability concerns.

An alternative method of creating a burst of pulses from a high repetition rate oscillator output is through the use of an acousto-optic modulator (AOM). AOMs, also commonly referred to as Bragg cells, operate on the principles of the acousto-optic effect, where an acoustic wave traveling through a crystal or liquid causes a small variation in the index of refraction. This variation appears to an optical beam passing through the medium as a sinusoidal grating with a wavelength equal to the acoustic wavelength. Thus, the incident light will be diffracted in the presence of the acoustic wave. Depending on the optical and acoustic properties of the AO material two operating regimes can occur: either isotropic or anisotropic. Isotropic interaction does not change the polarization of the beam with the AOM's being operated in Raman-Nath or Bragg regime, where most of the incident light can be diffracted into the first order. Anisotropic AO interactions change the polarization of the optical beam, and they result in a single diffracted order, with a higher efficiency and a larger acoustic optical bandwidths than the isotropic AO interactions.

Several properties of the AOM devices are important for pulse picking applications. Diffraction efficiency of the AOM device represents a percentage of how much the incident light is diffracted in the first order. A good conversion efficiency can account for as much as 90% of the zero order beam power into the first order beam power for an input beam with low divergence. A typical diffraction efficiency is around 80%. When a focused beam is used into the AOM, the diffraction efficiency tends to be lower due to the mismatch divergences of the optical and acoustic waves. Furthermore, there is an increased risk associated with focusing of the incident beam which can cause optical damage for even relatively low laser power levels. However, the faster response of this type of AOM is a convenient and useful characteristic that makes the focused type AOM commonly used in pulse picking setups.

The response time is determined by the time necessary for the acoustic wave to pass the optical beam. Besides the beam spot size in the AOM, the response of the AOM RF driver and the incident laser beam profile can further affect the overall response time of the AOM.

For a beam with waist diameter D, this time is given by the ratio of the beam diameter to the speed of sound in the material v.

$$t_r = \frac{0.65 D}{v},$$

Different materials can be selected for the use in the AOM devices, depending on the particular desired rise time value and the input power. Typical values for the speed of sound are 4.21 mm/µsec (TeO$_2$), =3.63 mm/µsec (PbMoO4), and 5.96 mm/µsec (Fused Silica).

The ability of separating a single pulse at a desired frequency is a crucial factor in pulse picking applications. In order to successfully isolate a single pulse from the oscillator pulse train, a faster rise time of the AOM becomes necessary, and therefore a smaller spot size inside the AOM should be used. Utilizing a beam with a small diameter inside the AOM introduces a series of limitations and drawbacks. Due to the angular dependence of the diffraction efficiency on the light propagation direction, when a beam is focused too tight inside the AOM, the diffraction efficiency decreases, as mentioned before and the beam profile can become distorted.

When a single pulse at a lower repetition rate is selected, the pulse energy is small, and needs to undergo further amplification. Any amount of light passing through the AOM when the applied RF frequency is off—which is called background light, will be amplified in the downstream optics and reduce the gain for the useful pulse picked signal. Minimization of the background light can be done by appropriately choosing the extinction ratio of RF driver, which is the ratio between the maximum output RF level to the minimum output level. Typically, most RF drivers can achieve extinction ratios of 40-45 dB, which is not enough for some applications. Higher RF extinction ratios are difficult to achieve, and become an expensive solution for reducing the background light level associated with this poor extinction.

The background contrast ratio is not the only parameter that needs to be optimized in pulse picking setups. Due to the response time of the AOM, a small prepulse preceding the main pulse and a small post pulse following the main pulse can appear. The side pulse contrast ratio represents the ratio between the peak intensity of a main pulse and the intensity of any low lying pre-pulse or post pulse and its value needs to be minimized for efficient amplification in further stages.

To lower these contrast ratios, the use of two AOMs in series has been proposed to clean up the background pulses and to improve the side pulse contrast ratio. Several commercial products based on this idea are offered for improving the contrast ratio in the AOM. The high contrast ratio (6000:1) is achieved by placing two Bragg cells in a series configuration, with one beam passing through two Bragg cells. The optical setup becomes a challenging task for achieving a good pulse picked beam profile from the AOM devices due to the elipticity of the diffracted order. Correcting this elipticity often requires additional components such as cylindrical lenses and a careful optical alignment procedure. Therefore, this approach requires not only multiple Bragg cells which are driven by additional RF drivers, but additional optical components which offsets the practical advantages of the AOM pulse picker versus the EO based pulse pickers. See U.S. Pat. No. 7,907,334 B2

Furthermore, the amplification of the pulse picked beam in further stages has to take into account a proper isolation system that will prevent damaging the device due to the self lasing or back reflections. There is still a need for a simple, compact and reliable AOM pulse picker system with a low component cost that will preserve the excellent background and prepulse contrast ratio f the EO devices.

SUMMARY OF THE INVENTION

In the present invention, a double pass pulse picker acousto optical modulator (AOM) is employed, in which the first order of the first pass is reflected and refocused back into the AOM device, which operates in a Bragg regime. The first order in the second pass follows the same path as the input seed beam, and is extracted through a polarization optics assembly.

The double pass acousto optical modulator (herein after AOM) solves the issue of a lower contrast ratio encountered in a single pass AOM pulse picker by further cleaning the remaining background and side pulse contrast ratios from the first pass. The final contrast ratio is increased in a multiplicative manner, up to a total of the square of the contrast ratio of the first pass. Due to the significantly improved contrast ratio in the double pass configuration, the beam size in the AOM can be increased, thus improving the overall diffraction efficiency and the alignment sensitivity. Another beneficial effect of being able to focus the incident beam to a larger spot size in the AOM is a reduction of the elipticity of the beam profile, which is a direct consequence of a better matching of the acoustic divergence and the optical input divergence.

In the present invention, a double pass AOM is used in a pulse picker system. According to the invention, a laser system for supplying ultra short pulses at a desired repetition rate having an advantageous contrast ratio is provided. According to the invention, a mode locked laser supplies a high repetition seed pulse train along a seed beam path. A pulse picker is provided in optical communication with the mode locked laser. The pulse picker includes at least one polarizer in optical communication with the mode locked laser to provide a seed beam having a preselected linear polarization. A Faraday rotator in optical communication with the seed beam to rotate the preselected linear polarization of the seed beam by about 45° is provided. An acousto optical modulator (AOM) operating in the Bragg regime receiving the seed beam propagating through the Faraday rotator and diffracting the seed beam into a first order first pass beam and a zero order first pass beam is used. A reflector is provided in optical communication with the first order first pass beam to reflect and return the first pass first order beam into the acousto optical modulator. The modulator diffracts the first order first pass beam into a zero order second pass beam and a first order second pass diffracted beam, the first order second pass beam propagating on the substantially same path as the incoming seed beam but in the opposite direction. The reflector is a curved reflecting mirror or a reflecting mirror and a focusing lens. The reflector directs the first order first pass beam to substantially the same location in the AOM as the incoming seed beam. The first order second pass beam propagates back through the Faraday rotator where its polarization is rotated about 45°, and the resulting polarization is about orthogonal to that of the input seed beam. The first order second pass beam propagates back through the polarizer to separate first order second pass beam from the seed beam propagating along the same path to remove the first order second pass beam from the pulse picker as pulse output.

In another aspect of the invention, a half waveplate is provided in communication with the modulator and a Faraday rotator. As a result, the polarization of the seed beam is rotated about 45° where adding (or subtracting) 45° rotation of Faraday Rotator for a total either about 90° or about 0° rotation depending on direction of rotation of the half waveplate. Desirably the separated first order second pass beam is then directed into a multistage amplifier chain.

The preferred embodiment of the present invention is illustrated in the drawings and examples. However, it should be expressly understood that the present invention should not be limited solely to the illustrative embodiment.

BRIEF DESCRIPTION OF THE DRAWINGS

FIG. 6 is a graph of the contrast ratio of the single pass AOM pulse picker for different RF windows when the spot size in the AOM is about 40 microns.

FIG. 7 is a graph of the second pass first order diffracted beam astigmatism versus the distance between the retroreflection mirror and the AOM.

FIG. 9 is a graph of the contrast ratio of the single pass AOM pulse picker amplified in a MOPA for different RF windows when the spot size in the AOM is about 40 microns.

FIG. 10 is a graph of the contrast ratio of the double pass AOM pulse picker amplified in a MOPA for different timing windows when the spot size in the AOM is about 50 microns.

DETAILED DESCRIPTION OF THE INVENTION

Figure 1:
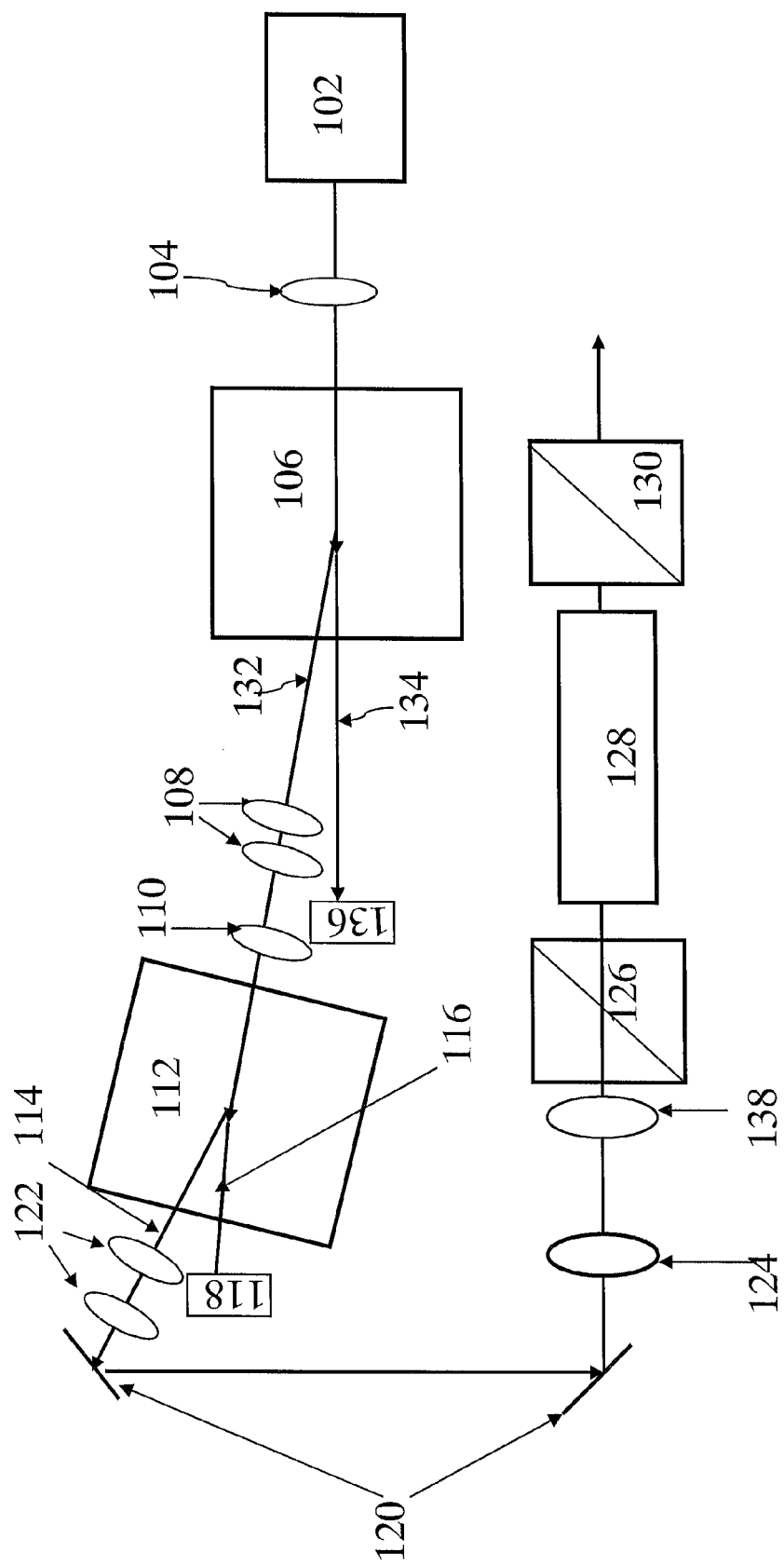
FIG. 1 is a schematic view of a laser according to the prior art.

In the present invention, a single AOM operated as a double pass AOM is provided. According to the invention, a laser system for supplying ultra short pulses at a desired repetition rate having an advantageous contrast ratio is provided. According to the invention, a mode locked laser desirably a Nd:YV0$_4$ laser lasing at a wavelength of 1064 nm, a Nd:YLF or Nd:YAG or other desired seed laser supplies a high repetition seed pulse train along a seed beam path.

According to the present invention, an apparatus for and a method of changing the repetition rate of a mode locked oscillator is provided. A seed beam having a preselected linear polarization from the mode locked oscillator is directed on a seed beam path. In the present invention, a double pass AOM is used in a pulse picker system. According to the invention, a laser system for supplying ultra short pulses at a desired repetition rate having an advantageous contrast ratio is provided. According to the invention, a mode locked laser supplies a high repetition seed pulse train along a seed beam path. A pulse picker is provided in optical communication with the mode locked laser. The pulse picker includes at least one polarizer in optical communication with the mode locked laser to provide a seed beam having a preselected linear polarization. A Faraday rotator in optical communication with the seed beam to rotate the preselected linear polarization of the seed beam by about 45° is provided. An acousto optical modulator (AOM) operating in the Bragg regime oriented for receipt of a beam having a 45° polarization receives the seed beam propagating through the Faraday rotator and diffracts the seed beam into a first order first pass beam and a zero order first pass beam. A reflector is provided in optical communication with the first order first pass beam to reflect and return the first pass first order beam into the acousto optical modulator. The modulator diffracts the first order first pass beam into a zero order second pass beam and a first order second pass diffracted beam, the first order second pass beam propagating on substantially the same path as the incoming seed beam but in the opposite direction. The reflector is preferably a curved reflecting mirror or a reflecting mirror and a focusing lens. The reflector directs the first order first pass beam to substantially the same location in the AOM as the incoming seed beam. The first order second pass beam propagating back through the Faraday rotator where its polarization is rotated about 45°, and the resulting polarization is about orthogonal to that of the input seed beam. The first order second pass beam propagates back through the polarizer where first order second pass beam is separated from the seed beam propagating along the same path to remove the first order second pass beam from the pulse picker as pulse output.

In another aspect of invention, a seed beam passes through a Faraday rotator and a half wave plate to rotate the polarization of the seed beam 90° to the linear preselected polarization. The beam propagating from the Faraday Rotator and half wave plate is then focused to a preselected spot size. The focused beam is directed into an AOM oriented for receipt of the polarization of the seed beam rotated 90° to the linear preselected polarization to incident on the AOM at a preselected location on the AOM such that the beam is separated into zero order beam and a first order first pass beam with a preselected beam separation. The first order first pass beam is reflected back to the AOM. Prior to the first order first pass beam being incident on the AOM, the beam is focused to a preselected spot size. The focused and reflected first order first pass beam incident on the AOM at about the same preselected location as did the incoming seed beam. The first order first pass beam is then separated into zero order beam and a first order second pass beam with a preselected beam separation. The first order second pass beam travels on the approximately the same path as the seed beam only in the opposite direction. The first order second pass beam propagates back through the Faraday rotator and a half wave plate where the polarization is unchanged that is it remains rotated 90° to the linear preselected polarization of the seed beam propagating from the polarizer. The second pass first order beam from the Faraday rotator and half wave plate is directed to the polarizer to separate the second pass first order beam from the seed beam to extract the second pass first order beam from the pulse picker. Desirably the separated first order second pass beam is then directed into a multistage amplifier chain.

In another aspect of the invention, a pulse picker is provided in optical communication with a mode locked laser. The pulse picker is composed of a first polarizer located along the seed beam path. The first polarizer is desirably a first thin film polarizer or Glan polarizer transmissive for a preselected polarization. A half waveplate in optical communication with the seed beam is provided. A Faraday rotator in optical communication with the half waveplate to rotate the preselected polarization of the seed beam by 90° is also provided along the seed beam path. A focusing lens is provided in optical communication with seed beam propagating from the half wave plate and the Faraday rotator.

The seed beam is focused by a lens into an acousto optical modulator (AOM) desirably an isotropic AOM operated in the Bragg regime at a frequency of 200 MHz or higher. The focused spot size inside the AOM is selected within a range of 40 to 60 microns and the location is preselected inside the acoustic aperture. When the RF power is on, the seed beam is deflected into a zero order beam and a first pass first order beam. As seen in FIG. 6, for a spot size of about 40 microns, the prepulse contrast ratio in the single pass changes from 300 for an RF window of 14 ns to about 130 for a 16 ns window. At the same time, the post pulse contrast ratio changes from 90 for the 14 ns window to 60 for the 16 ns window. The contrast ratio for adjacent pulses will decrease further if the spot size is made smaller.

Figure 4:
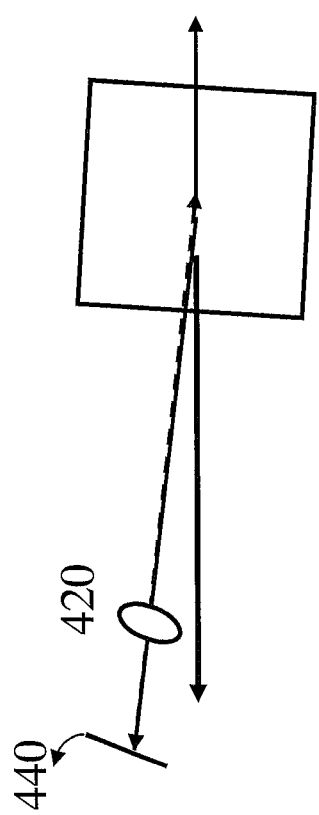
FIG. 4 is a schematic view of a reflector used in the laser according to the invention.

After it exists the AOM, the zero order beam will be spatially separated from the first order beam by the Bragg angle, and is blocked by a beam dump. The first order single pass beam is allowed to propagate and is reflected back by a reflector into the AOM for a second pass. The reflector can be for example a flat mirror and a lens or a curved mirror as seen in FIG. 4. After existing the AOM, the beam profile of the single pass first order exhibits an ellipticity due to the mismatch of the acoustic wave and optical wave divergences.

Figure 5A:
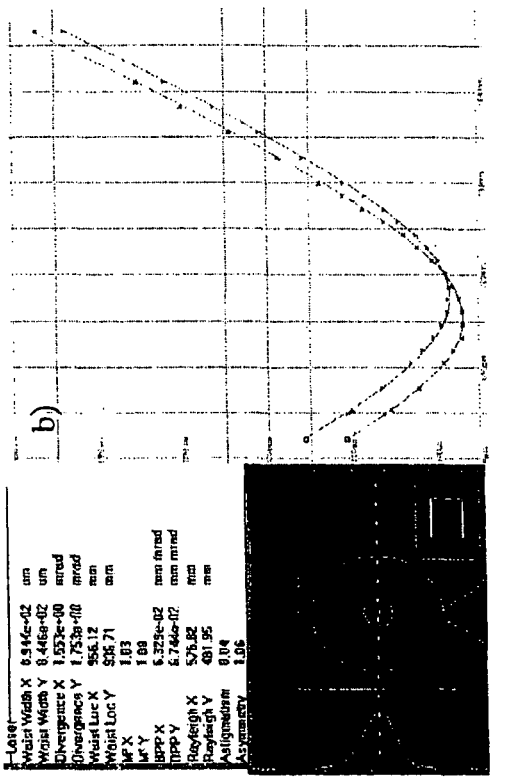
FIG. 5A is a graph of the beam profile of the first diffracted order in the first pass.
Figure 5B:
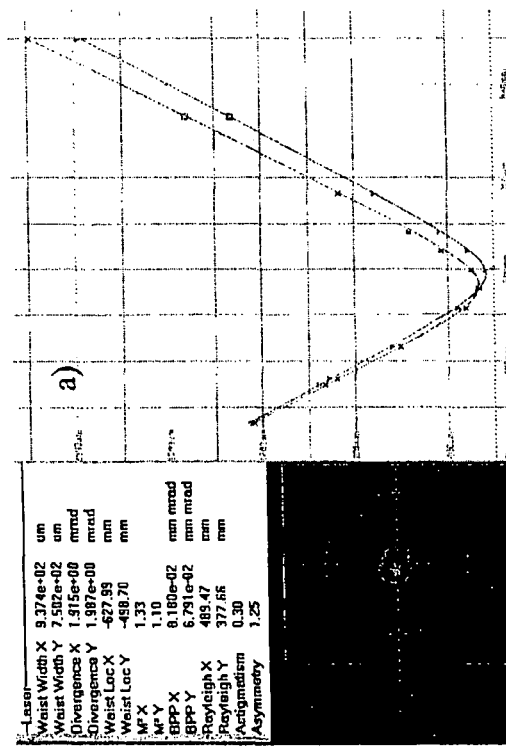
FIG. 5B is a graph of the beam profile of the first diffracted order in the second pass.

The reflected beam incidents on the AOM at about the same preselected spot as does the incoming seed beam. The reflected beam is focused on the AOM at a preselected spot location, with a preselected beam size of about 40 to 60 microns. The modulator diffracts the reflected first order first pass beam into a zero order and first order second pass diffracted beam separated by the same Bragg angle. The first order second pass beam propagates on the same path as the incoming seed beam only in the opposite direction. Changing the position of the retroreflecting mirror with respect to the AOM, allows the beam profile of the first order second pass to improve as seen in FIGS. 5A and 5B. The beam profile of the second pass first diffracted order is monitored by slightly changing the retro mirror position. It can be seen in FIG. 7 that for an optimum position of the retro mirror the astigmatism of the second pass becomes zero.

Figure 8:
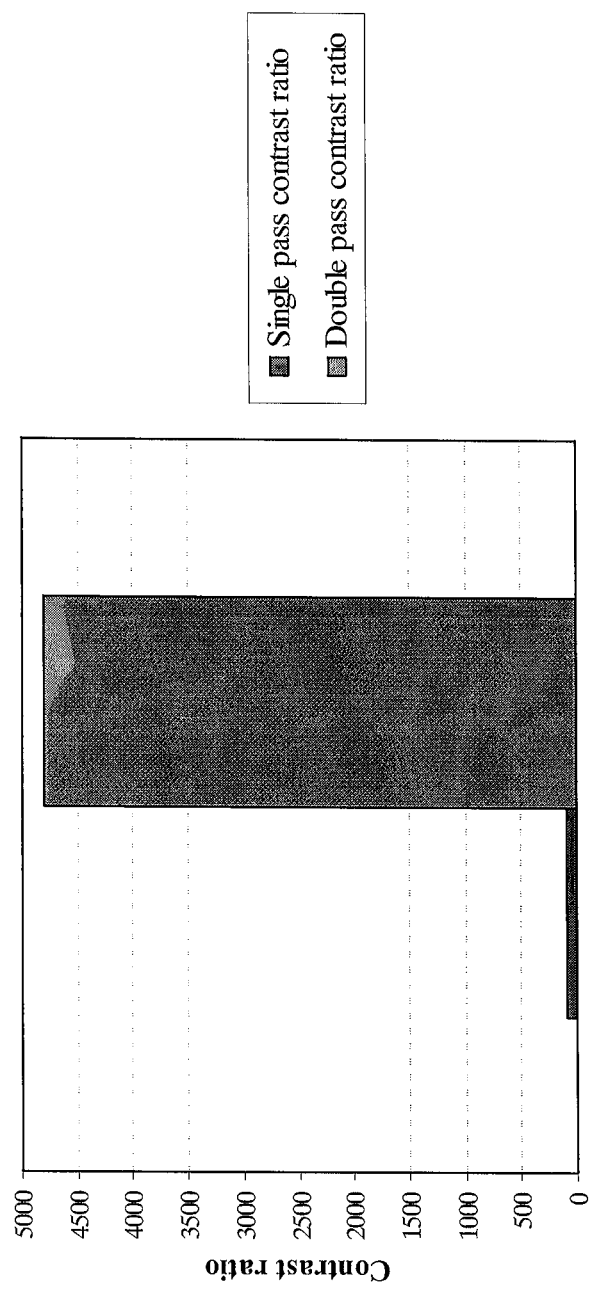
FIG. 8 graphical comparison of single pass AOM versus double pass AOM contrast ratio for a spot size in the AOM of about 50 microns.

For the 40 microns beam, the contrast ratio in the second pass is improved considerably to the extent that was not even measurable. Therefore, the beam size inside the AOM can be made larger such that the contrast ratio after the double pass has a desired value for the application process. For example, as seen in the FIG. 8, the focused beam size can be increased to 50 microns, while keeping more than 4000:1 contrast ratio, theoretically up to a value of the square of the contrast ratio in the first pass. As expected, the contrast ratio in the first pass decreases to about 80:1, while at the same time the overall diffraction efficiency increases.

The first order second pass beam propagates back through the focusing lens, for collimation. It then passes through the Faraday Rotator and half waveplate where the beam has a polarization rotated 90° to the preselected polarization and then reflected by the thin film polarizer for delivery of ultra short output pulses with variable repetition rate, having a contrast ratio of 6000:1 or better.

In another aspect of the invention the pulse picked signal is amplified in a multistage amplifier. In such an embodiment a second polarizer desirably a thin film or Glan polarizer—preferably a Glan polarizer is provided in optical communication with the Faraday rotator to act as an optical isolator between the AOM and the optical amplifier. The optical isolation is desirable due to the selflasing from the amplifier chain which can propagate towards the AOM, and causing damage to the device.

The Glan Polarizer is desirably located between the focusing lens and Faraday Rotator. The focusing lens collimates the first order second pass beam. The first order second pass beam is then directed to Faraday rotator and ½ wave plate and is then desirably directed to a thin film polarizer which directs the beam to a multistage amplifier chain to amplify the pulse picked beam.

By taking advantage of the method of extracting the pulse picked beam, and adding a thin film polarizer or Glan polarizer, the need of adding an extra stage of isolation is eliminated. Thus, the optical system becomes robust, reliable and compact, while delivering a train of pulse picked pulses with a high contrast ratio.

After the amplification of the pulse picked signal, the contrast ratio will change depending on the repetition rate. For example, when the beam from the first order single pass is injected into the amplifier, the pre-pulse contrast ratio changed from 150:1 at a repetition rate of 1 KHz to almost 300:1 at a repetition rate of 500 KHz for an Rf window of 14 ns and a spot size of about 40 microns. It is evident from FIG. 9 that the marginable contrast ratio of 300:1 achieved in the single pass AOM pulse picker deteriorates at low repetition rates, and degrades the amplifier performance.

When the dual pass AOM pulse picker is employed in an amplifier stage, the contrast ratio for the pre-pulse can be enhanced to a much larger value at all repetition rates by adjusting the timing window, as illustrated in FIG. 10. Typically, the prepulse contrast ratio rather than the post-pulse contrast ratio is a parameter that needs to be optimized, simply because the prepulses may substantially reduce the amplifier gain for the main-pulse. For the double pass amplifier, the prepulse contrast ratio that can be achieved is greater than 9000:1 and is limited by the resolution of the measuring devices.

The overall diffraction efficiency for the double pass pulse picker is an important parameter that needs to be considered. Due to the small beam size required in the single pass pulse picker, the diffraction efficiency is reduced. Meanwhile, by enlarging the spot size in the AOM for the double pass version, the diffraction efficiency can be brought up to almost at the same level as the single pass with 40 microns. Thus, an efficient pulse picker with a high contrast ratio can be realized.

In another aspect of the invention, a method of changing the repetition rate of a mode locked oscillator is provided. A seed beam from a mode locked laser is directed on a seed beam path. The polarization of the seed beam is desirably rotated 90° to a preselected polarization. Optionally the beam can be delivered from the mode locked laser as the preselected polarization. The beam is then passed through a thin film polarizer transmissive for the preselected polarization to remove polarized beam having a polarization other than the preselected polarization. The beam transmitted from the thin film polarizer is then directed through a Faraday rotator and a half wave plate to rotate the preselected polarization by 90° degrees. The rotated beam is then focused to a preselected spot size in a range of 40-60 microns. The focused beam is directed into a single AOM desirably an isotropic AOM operated at the Bragg regime in a double pass at a preselected location on the AOM such that the beam is separated into zero order beam and a first order first pass beam with a preselected beam separation. The beam separation is given by the Bragg angle of the AOM. The first order first pass beam is reflected back to the AOM. The reflected beam is focused to a preselected spot size desirably a preselected spot size in a range of 40-60 microns prior to it incidenting on the AOM for a second pass. The focused and reflected first order first pass beam incidents on the AOM at about the same preselected location as the seed beam which is within Rayleigh range of incoming beam location such that the first order first pass beam is separated into zero order beam and a first order second pass beam with a preselected beam separation. Desirably the zero order beam is directed to a beam dump. The first order second pass beam travels on substantially the same path the seed beam only in the opposite direction. The first order second pass beam is then directed towards a focusing lens where it is focused and desirably substantially collimated and then directed through a Faraday rotator and a half wave plate. As described above the Faraday Rotator rotates the polarization −45° and half wave plate 45° for no net change in polarization in this direction so the polarization of the first order second pass beam remains rotated 90° degrees from the preselected polarization. The second pass first order beam from the Faraday rotator and half wave plate is directed to a polarizer reflective to the rotated polarization to extract the polarization rotated second pass first order beam as the output beam.

Optionally, in the case that the polarization of the mode locked lasers is not rotated, the second pass first order beam can be transmitted through the thin film polarizer.

Desirably the pulse picker output beam is directed into a multistage amplifier chain in optical communication with the first order second pass beam to amplify the output beam. Desirably an isolator is provided which consists of adding a second polarizer in optical communication with the Faraday Rotator and half wave plate desirably the second polarizer is located between the AOM and the Faraday Rotator. An optional input polarizer can also be used which works as a filter to allow only linearly polarized light into the Faraday rotator. Any back reflected beams from the amplifier will have a polarization perpendicular to that of the seed beam after passing through the Faraday Rotator and will be rejected by the second polarizer.

Referring to FIG. 1, a prior art scheme is described for changing the repetition rate of a seed laser and pulse picking a single pulse with a high contrast efficiency. The seed from a high repetition rate laser 102 is focused by a lens 104 into an acousto optical modulator 106, where it is diffracted into a first order beam 132 and a zero order beam 134. The zero order beam 134 is blocked into a beam dump 136. The seed beam is focused into the AOM into a small spot size. The profile of the first order beam 132 can be elliptical and corrected optionally by a pair of cylindrical lenses 108 and refocused into a second AOM 112 by a spherical lens 110. The input seed beam 132 into the second AOM 112 is diffracted into a first order beam 114 and a zero order beam 116. The zero order beam 116 is blocked by a beam dump 118. The first diffracted order beam 114 is redirected by a pair of mirrors 120 into a (optional) pair of cylindrical lenses 122 and recollimated by a spherical lens 124. The first order diffracted beam 114 passes through an isolation system comprised of a thin film polarizer or Glan polarizer 126, a Faraday Rotator 128, and a Glan or thin film polarizer 130 and is directed into an amplifier system.

Figure 2:
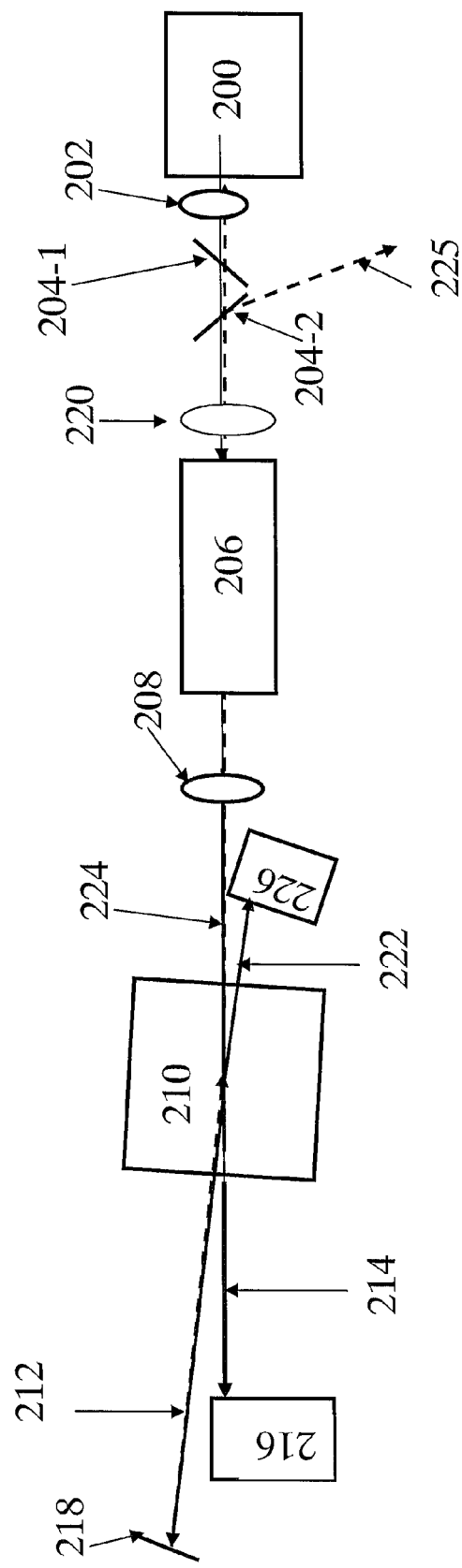
FIG. 2 is a schematic view of a laser according to the invention.
Figure 3:
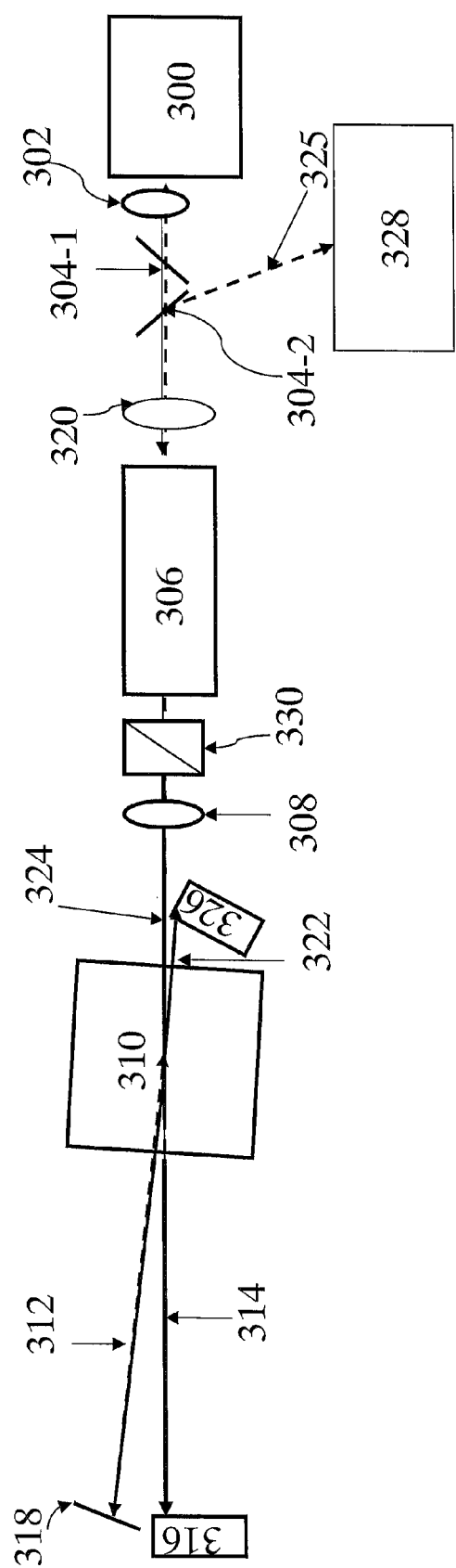
FIG. 3 is a schematic view of an alternative embodiment a laser according to the invention.

Referring to FIG. 2, a system for supplying ultra short rapid pulses having an advantageous contrast ratio, while optimizing the cost and the footprint of the system according to the invention is provided. The system uses a single AOM operated in a double pass mode to deliver a high contrast ratio and deliver a good diffraction efficiency which results in an efficient amplification in subsequent optical stages as best seen in FIG. 3. A seed beam supply is provided: desirably a mode locked laser for producing a high repetition seed pulse train along a seed beam path. Desirably, a mode locked laser 200 is supplied, preferably a Nd:YVO$_4$ mode locked laser lasing at a wavelength of 1064 nm. The seed pulse train provided by mode locked laser 200 has a preselected linear polarization. Optionally, the beam is directed to a half waveplate 202 where the polarization is rotated 90 degrees to a desired polarization. The seed beam pulse train is then directed to thin film polarizer 204-1 which is located along the seed beam path at the Brewster angle. In the embodiment of FIG. 2 the thin film polarizer fixes the polarization of the seed-beam to horizontal as required by the half waveplate and eliminates any extraneous non-horizontally polarized light. The reflection off the thin film polarizer can be used as a signal for monitoring the modelocked status of the seed laser. The beam then passes through a second thin film polarizer 204-2 which is also set at the Brewster angle. The second thin film polarizer will be used to separate the first order diffracted beam in the second pass through the AOM. A single polarizer could be used to transmit the horizontally polarized seed beam and to reflect the first order second pass beam. The horizontally polarized seed beam is then directed to a half waveplate 220 where the polarization is rotated by 45 degrees. The seed beam is then directed to a Faraday Rotator 206 where the beam polarization is rotated by another 45 degrees to a vertical polarization.

The beam propagating from the Faraday Rotator 206 is then directed to a focusing lens 208 where the beam is focused to a preselected spot size preferably 40 to 60 microns and directed to an acoustic optic modulator (AOM) 210 operated in the Bragg regime at a frequency of 200 Mhz or higher to a preselected spot on the AOM. There the focused seed beam is diffracted to obtain a first order first pass beam 212 and a zero order first pass beam 214. The zero order beam 214 is terminated into a beam block 216. The first order beam has a contrast ratio of 80:1 to 400:1 desirably about 300:1 for the configuration of FIG. 2. A reflective surface, desirably a curved reflective mirror 218 or a reflecting mirror a 440 and a focusing lens 420 as best shown in FIG. 4 is provided so that the first order diffracted beam in the first pass 212 is focused to a spot size of 40 to 60 microns and reflected back through the AOM 210 on the same incident spot for the seed beam in the first pass. The second pass beam is diffracted by the AOM 210 to form a second pass first order beam 224 which has a contrast ratio of 40,000:1 to 90,000:1. In practice, a contrast ratio of about 10000:1 is observed in the setup, due to the limitation of the measuring devices. The diffracted second pass first order beam 224 travels on the same path as did the incoming seed beam. The zero order in the second pass beam 222 is directed into a beam dump 226 before lens 208. The first order second pass beam 224 is then returned through focusing lens 208 where the beam is preferably collimated then directed to Faraday Rotator 206 and half waveplate 220. The resulting polarization is still vertical. The beam is then directed to incident on thin film polarizer 204-2 which reflects the beam as the output 225. The contrast ratio for the first pass first order beam is preferably in the order of 300 to 1. The contrast ratio for the first order second pass beam 224 is the square of the contrast ratio of the first beam, for example, 90,000 to 1.

Referring to FIG. 3, a further embodiment according to the invention is shown. Here a system for supplying ultra short rapid pulses having an advantageous contrast ratio is described where the high contrast ratio pulses are used in further amplification in a MOPA system 328. Exploiting the geometry of the separating the pulse picked signal, an isolation system is provided that prevents the damage of the AOM device due to back propagating self lasing from the amplifier stage. A seed beam supply desirably a mode locked laser for producing a high repetition seed pulse train along a seed beam path is provided. Desirably, a mode locked laser 300 is supplied. Desirably, the modelocked laser 300 is a Nd:YVO$_4$ laser lasing at a wavelength of 1064 nm. The seed pulse train provided by modelocked laser 300 has a preselected linear polarization. Optionally, the beam is directed to a half waveplate 302 where the polarization is rotated 90 degrees. The seed beam pulse train is then directed to thin film polarizer 304-1 which is located along the seed beam path at the Brewster angle. The thin film polarizer fixes the polarization of the seed-beam to horizontal as required by the half waveplate and eliminates any extraneous non-horizontally polarized light. The reflection off the thin film polarizer can be used as a signal for monitoring the modelocked status of the seed laser. The beam then passes through a second thin film polarizer 304-2 which is also set at the Brewster angle. The second thin film polarizer will be used to separate the first order diffracted beam in the second pass through the AOM. The horizontally polarized seed beam is then directed to a half waveplate 320 where the polarization is rotated by 45 degrees. The seed beam is then directed to a Faraday Rotator 306 where the beam polarization is rotated by another 45 degrees to a vertical polarization.

The beam propagating from the Faraday Rotator 306 is then directed to a thin film polarizer or Glan polarizer 330 which allows the vertical polarization to pass through. The beam is then directed to a focusing lens 308 where the beam is focused to a preselected spot size and directed to an acoustic optic modulator (AOM) 310 to a preselected spot on the AOM. There the focused seed beam is diffracted to obtain a first order first pass beam 312 and a zero order first pass beam 314. The zero order beam 314 is terminated into a beam block 316. The first order beam has a contrast ratio of 80:1 to 400:1 desirably about 300:1 for the configuration of FIG. 3. A reflective surface, desirably a curved reflective mirror 318 is provided so that the first order diffracted beam in the first pass 312 is reflected back through the AOM 310 on the same incident spot for the seed beam in the first pass. The second pass beam is diffracted by the AOM 310 to form a second pass first order beam 324 which has a contrast ratio of 40,000:1 to 90,000:1. In practice, a contrast ratio of about 10000:1 is observed in the setup, due to the limitation of the measuring devices. The diffracted second pass first order beam 324 travels on the same path as did the incoming seed beam. The zero order second pass beam 322 is terminated into a beam dump 326 before lens 308. The first order second pass beam 324 is then returned through focusing lens 308 where the beam is collimated then directed to the thin film polarizer or Glan polarizer preferably Glan polarizer 330 into a Faraday Rotator 306 and half waveplate 320. The beam is then directed to a thin film polarizer 304-2 which reflects vertically polarized beam to multistage amplifier 328. The contrast ratio for the first pass first order beam is preferably in the order of 300 to 1. The contrast ratio for the first order second pass beam 324 is the square of the contrast ratio of the first beam, for example, 90,000 to 1.

The reflected output beam 325 from the thin film polarizer 304-2 is sent for amplification into a MOPA amplifier 328. Desirably the pulse picker output beam is directed into a multistage amplifier chain in optical communication with the first order second pass beam to amplify the output beam. An isolation system is provided which consists of a Faraday Rotator 306, a half wave plate 320 and a polarizer preferably Glan polarizer 330 located between the AOM and the Faraday Rotator 306. An optional input polarizer 304-1 can also be used which works as a filter to allow only linearly polarized light into the Faraday rotator. The Faraday Rotator rotates the input light's polarization by 45°, after which it exits through another linear polarizer. The output light is now rotated by 45° with respect to the input signal. In the reverse direction, the Faraday rotator continues to rotate the light's polarization in the same direction that it did in the forward direction so that the polarization of the light is now rotated 90° with respect to the input signal. This light's polarization is now perpendicular to the transmission axis of the input polarizer, and as a result, the beam is either reflected or absorbed depending on the type of polarizer.

As best seen in FIG. 4 the curved mirror 318 can be replaced with a flat reflector preferably a flat mirror 440 and a focusing lens 420.

The foregoing is considered as illustrative only to the principals of the invention. Further, since numerous changes and modification will occur to those skilled in the art, it is not desired to limit the invention to the exact construction and operation shown and described above, and accordingly, all suitable modifications and equivalents may be resorted to, falling within the scope of the invention.

The invention claimed is:
1. A laser system comprising:
 a) a seed laser producing a high repetition seed pulse train along a seed beam path;
 b) a pulse picker in optical communication with said mode locked laser;
 said pulse picker comprising:
  i) a first polarizer in optical communication with said mode locked laser to provide a seed beam having a preselected linear polarization;
  ii) a Faraday rotator in optical communication with said seed beam to rotate the preselected linear polarization of said seed beam by about 45°;
  iii) an acousto optical modulator(AOM) operating in the Bragg regime receiving said seed beam propagating through said Faraday rotator and diffracting said seed beam into a first order first pass beam and a zero order first pass beam;
  iv) a reflector in optical communication with said first order first pass beam to reflect and return the first pass first order beam into the acousto optical modulator, said modulator diffracting said first order first pass beam into a zero order second pass beam and a first order second pass diffracted beam, said first order second pass beam propagating on the substantially same path as the incoming seed beam in the opposite direction;
  v) said reflector comprising of a curved reflecting mirror or a reflecting mirror and a second focusing lens;
  vi) said reflector directing the first order first pass beam to the substantially same location in the AOM as the incoming seed beam;
  vii) said first order second pass beam propagating back through said Faraday rotator where its polarization is rotated about 45°, and the resulting polarization is about orthogonal to the input seed beam;
  viii) said first order second pass beam propagating back through said first polarizer to separate first order second pass beam from said seed beam propagating along the same path to remove said first order second pass beam from said pulse picker as pulse output.

2. A laser according to claim 1, further comprising a half waveplate in communication with said Faraday Rotator and acousto optical modulator where polarization of said seed beam is rotated about 45° to add or subtract 45° rotation of Faraday Rotator for a total rotation of either about 90° or about 0° depending on direction of rotation of the half waveplate.

3. A laser system according to claim 2, further comprising a second polarizer in optical communication with said seed beam propagating from said Faraday Rotator and located between said AOM and said Faraday Rotator to form an isolator to prevent feedback from optical beam back through the first polarizer, said isolator producing at least 20 db isolation.

4. A laser according claim 1, further comprising a second focusing lens or lenses in optical communication with seed beam propagating from the said Faraday rotator prior to said seed beam incidenting on said AOM to focus said seed beam into AOM with a preselect beam diameter.

5. A laser according to claim 4, where said second focusing lens or lenses or said curved mirror focuses said seed beam diameter to between 40 and 150 microns into the AOM.

6. A laser according to claim 1, wherein said first pass first order beam having a contrast ratio of 30:1 or better.

7. A laser according to claim 1, wherein said second pass first order beam having a contrast ratio of 1000:1 or better.

8. A laser according to claim 1, wherein said second pass first order beam having a contrast ratio of 500:1 or better.

9. A laser according to claim 1, wherein said second pass first order beam having a contrast ratio of 5000:1 or better.

10. A laser system according to claim 1, further comprising a second polarizer in optical communication with said seed beam propagating from said Faraday Rotator and located between said AOM and said Faraday Rotator to form an isolator to prevent feedback from optical beam back through the first polarizer.

11. A laser system according to claim 1, further comprising one or more amplifier stages in optical communication with said first order second pass beam to amplify said beam.

12. A laser system according to claim 11, further comprising a second polarizer in optical communication with said seed beam propagating from said Faraday Rotator and located between said AOM and said Faraday Rotator to form an isolator to prevent feedback from optical beam back through the first polarizer.

13. A laser system comprising:
 a) a mode locked laser producing a high repetition seed pulse train along a seed beam path;
 b) a pulse picker in optical communication with said mode locked laser;
 said pulse picker comprising:
  i) a first polarizer transmissive for a preselected polarization located along said seed beam path;

ii) a half waveplate in optical communication with said seed beam and a Faraday rotator in optical communication with said half wave plate to rotate the preselected polarization of said seed beam by 90°;

iii) a first focusing lens in optical communication with seed beam propagating from the said half wave plate and said Faraday rotator;

iv) an acousto optical modulator (AOM) operating in the Bragg regime receiving said seed beam propagating through said focusing lens and diffracting said seed beam into a first order first pass beam;

v) a reflector to reflect and return the first order first pass beam into the acousto optical modulator, said modulator diffracting said first order first pass first order beam into a first order second pass diffracted beam propagating on the same path as the incoming seed beam in the opposite direction;

vi) said reflector comprising of a curved reflecting mirror or a reflecting mirror and a second focusing lens where said first pass first order beam is both focused and reflected;

vii) said reflector directing the first order first pass beam to the same location in the AOM as the incoming seed beam;

viii) said first order second pass beam propagating back through said first lens where it is collimated, back through said Faraday rotator and half-waveplate where its polarization remains rotated 90° to said preselected polarization and said first polarizer where it is reflected as an ultra short output pulse.

14. A laser according to claim 13, wherein said ultrashort output pulses have a contrast ratio of 5000:1 or better.

15. A laser system according to claim 13, further comprising
ix) a multistage amplifier chain in optical communication with said first order second pass beam to amplify said beam.

16. A laser system according to claim 15,
x) a second polarizer in optical communication with said seed beam propagating from said halfwave plate and Faraday rotator and located between said AOM and said halfwave plate and Faraday rotator whereby said first order second pass beam is isolated from feed back from the first polarizer.

17. A laser system comprising:
a) a mode locked laser producing a high repetition seed pulse train along a seed beam path;
b) a pulse picker in optical communication with said mode locked laser;
said pulse picker comprising:
i) a first polarizer in optical communication with said mode locked laser to provide a seed beam having a preselected linear polarization;
ii) a half waveplate in optical communication with said seed beam and a Faraday rotator in optical communication with said half wave plate to rotate the preselected linear polarization of said seed beam by 90°;
iii) a first focusing lens in optical communication with seed beam propagating from the said half wave plate and said Faraday rotator;
iv) an acousto optical modulator(AOM) operating in the Bragg regime receiving said seed beam propagating through said first focusing lens and diffracting said seed beam into a first order first pass beam and a zero order beam;
v) a reflector in optical communication with said first order first pass beam to reflect and return the first pass first order beam into the acousto optical modulator, said modulator diffracting said first order first pass first order beam into a zero order beam and a first order second pass diffracted beam said first order second pass beam propagating on the same path as the incoming seed beam in the opposite direction;

vi) said reflector comprising of a curved reflecting mirror or a reflecting mirror and a second focusing lens;

vii) said reflector directing the first order first pass beam to the same location in the AOM as the incoming seed beam;

viii) said first order second pass beam propagating back through said first focusing lens where it is focused;

ix) said first order second pass beam propagating back through said Faraday rotator and half waveplate where its polarization is unchanged;

ix) said first order second pass beam propagating back through said first polarizer to separate first order second pass beam from said seed beam propagating along the same path to remove said first order second pass beam from said laser system.

18. A pulse picker comprising:
i) a first polarizer for receiving a seed beam having a preselected linear polarization;
ii) a Faraday rotator in optical communication with said seed beam to rotate the preselected linear polarization of said seed beam by about 45°;
iii) an acousto optical modulator(AOM) operating in the Bragg regime receiving said seed beam propagating through said faraday rotator and diffracting said seed beam into a first order first pass beam and a zero order first pass beam;
iv) a reflector in optical communication with said first order first pass beam to reflect and return the first pass first order beam into the acousto optical modulator, said modulator diffracting said first order first pass beam into a zero order second pass beam and a first order second pass diffracted beam, said first order second pass beam propagating on the substantially same path as the incoming seed beam in the opposite direction;
v) said reflector comprising of a curved reflecting mirror or a reflecting mirror and a second focusing lens;
vi) said reflector directing the first order first pass beam to the substantially same location in the AOM as the incoming seed beam;
vii) said first order second pass beam propagating back through said Faraday rotator where its polarization is rotated about 45°, and the resulting polarization is about orthogonal to the input seed beam;
viii) said first order second pass beam propagating back through said first polarizer to separate first order second pass beam from said seed beam propagating along the same path to remove said first order second pass beam from said pulse pickeras pulse output.

19. The pulse picker according to claim 18, further comprising a half waveplate communication with said Faraday Rotator and acousto optical modulator where polarization of said seed beam is rotated about 45° where adding (or subtracting) 45° rotation of Faraday Rotator for a total either about 90° or about 0° depending on direction of rotation of the half waveplate.

* * * * *